(12) United States Patent
Reeder

(10) Patent No.: US 6,317,450 B1
(45) Date of Patent: Nov. 13, 2001

(54) REEDER COMPENSATOR

(75) Inventor: Robin A. Reeder, El Segundo, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/482,376

(22) Filed: Jan. 13, 2000

(51) Int. Cl.⁷ .............................. H01S 3/08; G02B 27/28; G02B 5/30; G02B 7/02; G02B 5/04
(52) U.S. Cl. .................... 372/100; 372/105; 372/106; 359/830; 359/831; 359/497; 359/834
(58) Field of Search .................... 372/106, 100, 372/105; 359/830, 831, 833, 835, 497, 494, 485, 834

(56) References Cited

U.S. PATENT DOCUMENTS

| 4,408,334 | 10/1983 | Lundstrom . |
| 5,504,763 | * 4/1996 | Bischel et al. ..................... 372/33 |
| 6,198,574 | * 3/2001 | Hill ..................... 359/497 |

FOREIGN PATENT DOCUMENTS

| WO 81 02224 A | 8/1981 | (WO) . |
| WO 86 03066 A | 5/1986 | (WO) . |
| WO 95 22187 A | 8/1995 | (WO) . |

* cited by examiner

*Primary Examiner*—Frank G. Font
*Assistant Examiner*—Armando Rodriguez
(74) *Attorney, Agent, or Firm*—Colin M. Raufer; Leonard A. Alkov; Glenn H. Lenzen, Jr.

(57) ABSTRACT

A thermal birefringence compensator for a double pass laser system, which includes a polarization or conventionally outcoupled laser resonator, a gain medium and a compensator optically coupled to the gain medium. In one implementation, the compensator, which acts as an end reflector, includes a Benson prism, a first quarter waveplate with its principle axes aligned to the fold axis of the Benson prism, and a second quarter waveplate with its principle axes at 45° to the fold axis of the Benson prism. Alternatively, the compensation's prism can be a Porro prism.

4 Claims, 3 Drawing Sheets

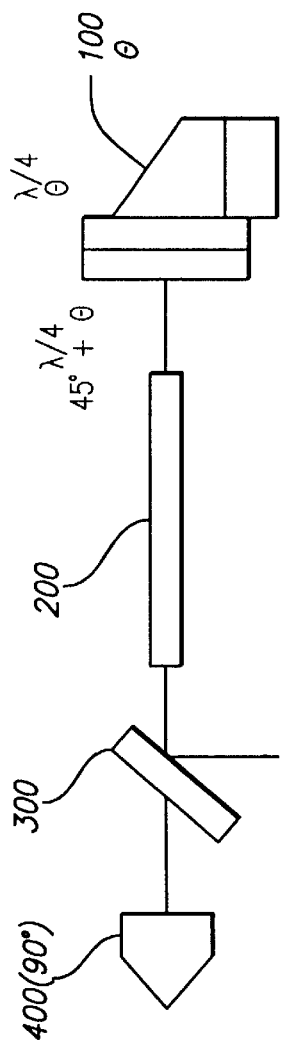
FIG. 7
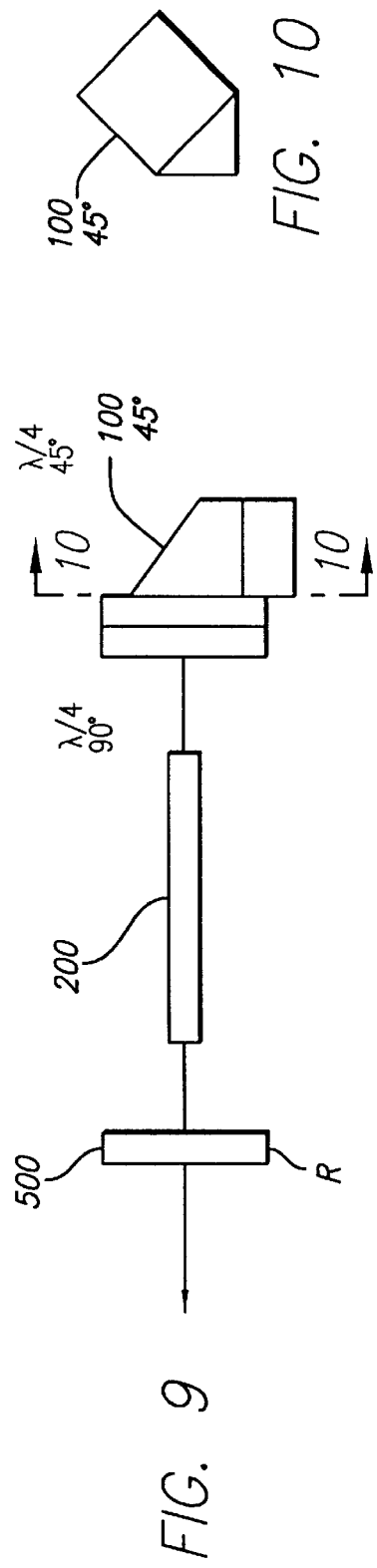
FIG. 9
FIG. 10
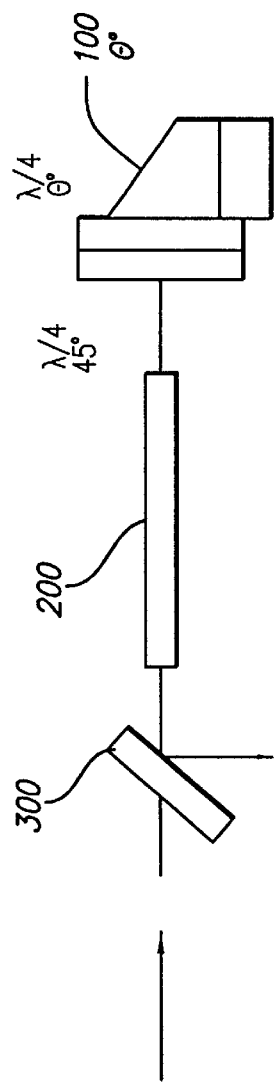
FIG. 11

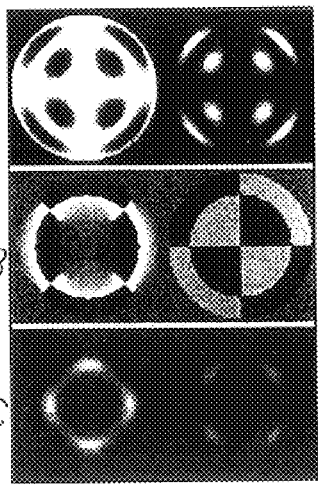
FIG. 8A
FIG. 8B
FIG. 8C
NEAR FIELD INTENSITY
NEAR FIELD PHASE
FAR FIELD INTENSITY
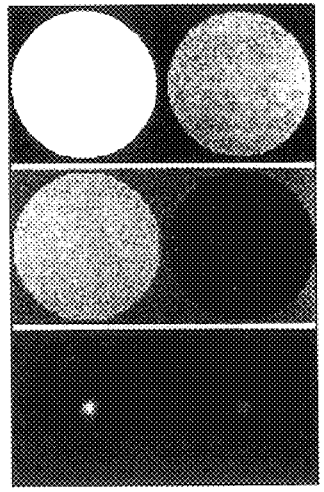
FIG. 8D
FIG. 8E
FIG. 8F

US 6,317,450 B1

REEDER COMPENSATOR

BACKGROUND OF THE INVENTION

1. Field of the Invention

The present invention relates to compensators for laser systems. More specifically, the present invention relates to thermal birefringence compensators for laser rods employed in double pass laser systems.

2. Description of the Related Art

Correcting the thermal birefringence of a laser rod, upon a double pass of the rod, has been accomplished using a 45° Faraday rotator. However, use of a Faraday rotator has a number of disadvantages. First, Faraday rotators are large and expensive devices. Second, Faraday rotators often absorb at the operating wavelength of a laser amplifier. Third, Faraday rotators are easily damaged. Moreover, while Faraday rotators work fine at correcting a rod's thermal birefringence in a double pass amplifier, these rotators are difficult to implement in an oscillator.

In a polarization outcoupled (POC) laser oscillator, two Faraday rotators are necessary, one to correct the rod birefringence and the other to control the outcoupling fraction, which would be 100% otherwise.

Other inventions by this Applicant also assigned to Raytheon Company include:

"Reeder Rotator" (Ser. No. 09/483,254; Attorney Docket No. PD-R98093); "Reeder Rod" (Ser. No. 09/482,230; Attorney Docket No. PD-R98094); and "Waveplate Polarization Rotator" (Ser. No. 09/482,378; Attorney Docket No. PD-R98109). These applications are incorporated herein by reference.

What is needed is an optical device that corrects the thermal birefringence of a laser rod, upon a double pass of the rod. It would be beneficial if the postulated optical device were made entirely of reciprocal optics, i.e., waveplates and prisms. Moreover, it would be desirable if the postulated optical device advantageously could be used in both conventionally and polarization outcoupled oscillators and double pass amplifiers.

SUMMARY OF THE INVENTION

The need in the art is addressed by the compensator of the present invention which provides thermal birefringence compensation of a laser system having an optically pumped laser rod. The inventive compensator includes a total internal reflection (TIR) coated prism and a first quarter waveplate, in combination with a second quarter waveplate. The prism and the first quarter waveplate each have polarization properties similar to a mirror and provide a beam fold function. The second quarter waveplate is provided to compensate the birefringence of a laser rod upon a double pass of the rod. Preferably, the inventive compensator is an end reflector. Advantageously, the prism can be one of a Benson, i.e., a right angle roof, prism or a porro prism.

Moreover, a double pass laser system constructed in accordance with the present teachings can include a gain medium and a compensator optically coupled to the gain medium. In the preferred embodiment, the compensator includes a Benson prism, a first quarter waveplate with its principle axes aligned to the fold axis of the Benson prism, and a second quarter waveplate with its principle axes at 45°, to the fold axis of the Benson prism.

In an illustrative implementation, a double pass laser system is disclosed which includes a gain medium and a compensator optically coupled to the gain medium. Preferably, the compensator includes a Porro prism and a first quarter waveplate with its principle axis at 45° relative to the axis of the Porro prism. The total internal reflecting surfaces of the Porro prism are coated with a thin film to provide a 90° phase shift between s and p-polarizations upon reflection to provide the polarization-wise behavioral characteristics of a mirror.

BRIEF DESCRIPTION OF THE DRAWINGS

FIG. 7 illustrates one possible arrangement of the Reeder compensator of FIG. 1 employed in a polarization outcoupled (POC) laser oscillator.

FIGS. 8A–8F illustrate first and second passes through the laser rod depicted in FIG. 7.

FIG. 9 illustrates one possible arrangement of the Reeder compensator of FIG. 1 employed in a conventionally outcoupled laser resonator.

FIG. 10 is a sectional view of selected components of FIG. 9 which depicts the angular orientation of the selected elements.

FIG. 11 illustrates one possible arrangement of the Reeder compensator of FIG. 1 in a double pass laser amplifier.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The Reeder compensator according to the present invention is an optical device that corrects thermal birefringence of a laser rod, upon a double pass of the rod. Preferably, the Reeder Compensator is made entirely of reciprocal optics, i.e., waveplates and prisms. Assuming that the input state is linear, the Reeder compensator advantageously can provide any linear output state, which allows the compensator to be used in both conventionally and polarization outcoupled oscillators as well as double pass amplifiers.

Figure 1:
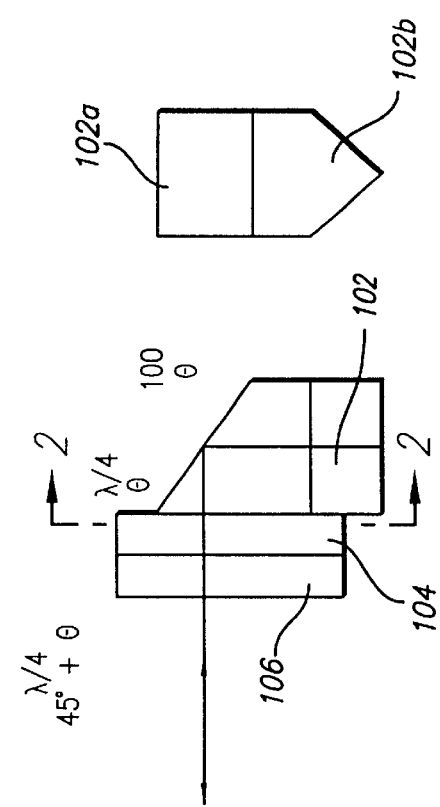
FIG. 1 illustrates a first preferred embodiment of a thermal birefringence (Reeder) compensator constructed in accordance with the teachings of the present invention.

The Reeder compensator has at least two embodiments, the first of which is illustrated in FIG. 1. Preferably, the Reeder compensator 100 according to the first preferred embodiment of the present invention includes, moving from right to left, a Benson prism 102, which is the equivalent of a right angle prism 102a attached to a Porro prism 102b, a quarter waveplate 104 with its principle axes aligned to the fold axis of the Benson prism 102, and another quarter waveplate 106 with its principle axis at 45° to the fold axis of the Benson prism 102. The elements of the compensator 100 may be constructed of optical grade glass or other suitable material.

Figure 2:
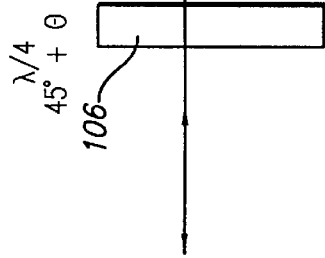
FIG. 2 is a sectional view of selected elements depicted in FIG. 1.

The orientation the Benson prism 102 is illustrated in FIG. 2. It should be mentioned that Benson prisms are well known devices, which are sometimes referred to a right angle roof prisms. This preferred embodiment of the Reeder compensator 100 will be discussed in greater detail before discussing the other preferred embodiment according to the present invention.

Figure 3:
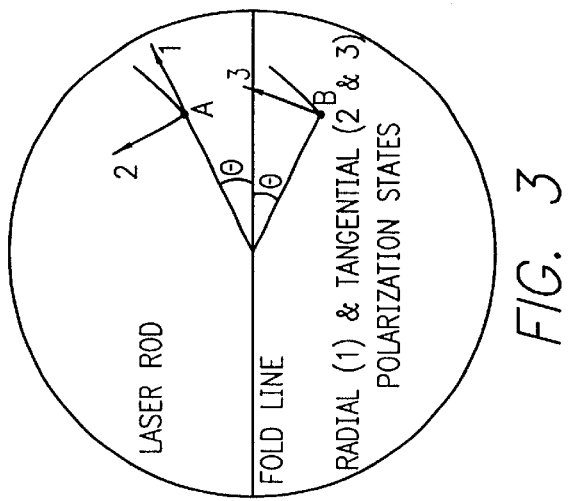
FIG. 3 is a polarization/ray trace diagram showing a double pass of a laser rod which facilitates an understanding of the Reeder compensator depicted in FIG. 1.

The operation of the Reeder compensator may best be understood by considering a beam folded about the horizontal line through the middle of the rod, where point A is mapped onto point B in conjunction within the diagram of FIG. 3. The radial and tangential polarization states are labeled 1 and 2, respectively, where these states are aligned with the principle axes of the rod, at that point.

State 1 is transformed so that it aligns with tangential state 3 (point A is mapped onto point B by the fold). The transformation of polarization state 1 to state 3 is done with a double pass of a quarter waveplate 106 oriented at 45° to the fold axis. It will be noted that the angle of state 3 with respect to a 45° line is equal and opposite than that of state 1 with respect to a 45° line, which is true for any starting point on the rod. The net effect of this is that a radially polarized ray on the first pass is transformed to a tangentially polarized state on the second pass, and vice versa, compensating the birefringence, all polarization states having the same total phase delay. In contrast, conventional Scott-Dewit compensation employs a Faraday rotator (no fold) to turn the polarization state 90° between passes so that radial polarization becomes tangential polarization, and vice versa, thus compensating the birefringence.

Preferably, the optics to the right of the 45° quarter waveplate 106 have no net effect on the polarization state of the light, i.e., that they behave polarization-wise just like a mirror, even though it is necessary to have a fold. It should be mentioned that a Benson prism, aside from the fold, behaves like a half waveplate and, thus, another half waveplate (two passes of a quarter waveplate), with its principle axes aligned with those of the Benson prism 102 (at 0° as shown), is required.

Figure 4:
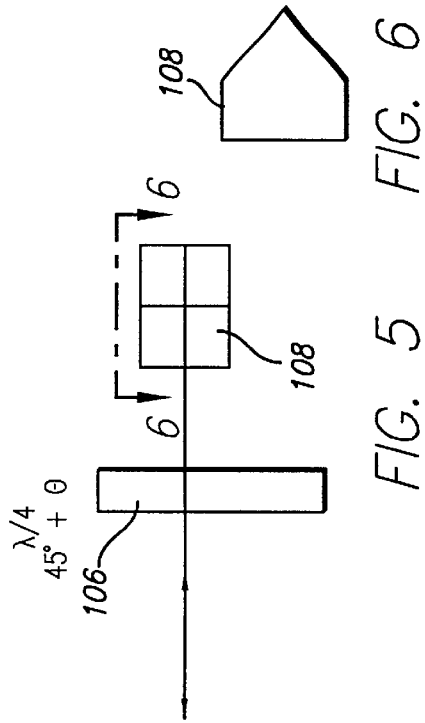
FIG. 4 is an alternative illustration of the Reeder compensator of FIG. 1.

Thus, the Reeder compensator 100 includes two functional elements. The first is a fold prism that behaves polarization-wise like a mirror. The prism is shown in FIG. 4 as the right two elements 102, 104. The second is a quarter waveplate 106 oriented 45° to the fold axis, shown on the left side of FIG. 4.

Figure 5:
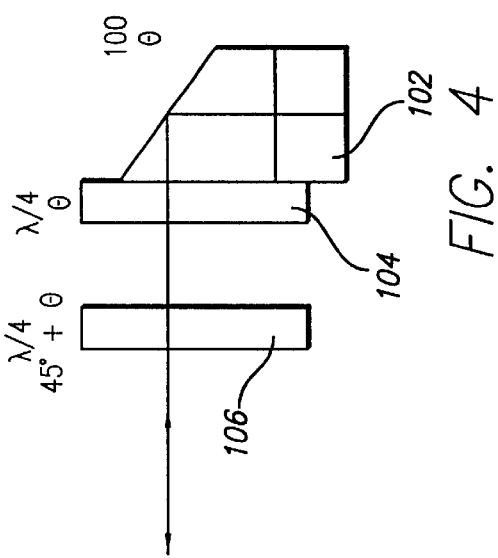
FIG. 5 illustrates another preferred embodiment of the Reeder compensator according to the present invention.
Figure 6:
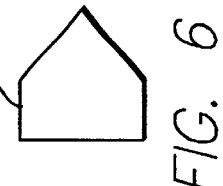
FIG. 6 is a sectional view of one component in FIG. 5 to facilitate understanding of the element's geometry.

The right set of fold optics advantageously could be replaced with a Porro 108 that behaves polarization-wise like a mirror, i.e., the TIR surfaces must be coated with a thin film to give a 90° phase shift between s and p-polarizations upon reflection, i.e., 180° after two reflections, as illustrated in FIGS. 5 and 6.

FIG. 7 illustrates a polarization outcoupled (POC) laser oscillator that utilizes the Reeder compensator depicted in FIGS. 1 and 4, which includes Reeder compensator 100, gain medium (rod) 200, a polarizing beam splitter 300 and a Porro reflector 400. It will be appreciated that the outcoupling fraction from this resonator is:

$$\Omega = \cos^2(2\theta). \quad [1]$$

After one pass of the rod 200 with two waves of thermal birefringence, a uniform x-polarized field would appear as illustrated in FIGS. 8A–8C. After the second pass, with the outcoupling set to 40%, the field appears as illustrated in FIG. 8D–8F, assuming no diffraction, with the intensity being uniform and the phase being flat, for both polarization states, i.e., the birefringence is corrected.

It should be mentioned that the conventionally outcoupled laser resonator illustrated in FIGS. 9 and 10 advantageously can be formed if the outcoupling is set to zero, i.e., an angle of 45°, since then the polarizer 300 can be dropped and a partially reflective outcoupler 500 can be substituted on the left side of the structure illustrated in FIG. 7. In a similar manner, a double pass amplifier can be fabricated if the outcoupling is set to 100%, i.e., an angle of 0° (or 90°), then the Reeder compensator 100 can be used in an amplifier configuration, i.e., the left end mirror 400 advantageously can be dropped, as illustrated in FIG. 11. In both these cases, the rod's thermal birefringence is corrected.

It should be mentioned that in all the configurations, it is assumed that the average lensing of the rod 200 is compensated with a corrective lens. Lenses advantageously may be used to properly image the rod onto itself between passes. Also, no mention has been made of Q-switch type or location.

A double pass of the rod 200 with the Reeder compensator 100 as an end reflector can be described in terms of Jones polarization matrices. Let the polarization effects of some point on the rod be described by the waveplate matrix $W(\nu,\theta)$. A ray traversing this point is mapped onto a point on the rod described by the waveplate $W(\nu,-\theta)$, where the fold axis is parallel to the x-axis for this analysis. Of course, the rod pump/cooling must have mirror symmetry across the fold. The Reeder compensator 100, traversed between rod passes is described as a double pass of a quarter waveplate at 45E (the fold already being taken care of), i.e., a net half waveplate at 45°, $W(\pi 45°)$. Thus, the Jones matrix for the total path is $$W(\phi,-\theta)W(\pi 45°)W(\phi,\theta) = W(\pi 45°), \quad [2]$$

The result does not depend on the arbiy phase and angle of the waveplate describing the rod and, thus, this result holds for all points on the rod, i.e., thermal birefringence is corrected.

In summary, the Reeder compensator according to the present invention corrects the thermal birefringence of a laser rod upon a double pass as well as or better than a 45° Faraday rotator. However, the Reeder compensator does much more than simply compensate for thermal birefringence. The Reeder compensator advantageously can be used in a polarization outcoupled (POC) oscillator with the outcoupling fraction being completely adjustable. In particular, the outcoupling fraction can be set to zero for use in a conventionally outcoupled (partial reflector) laser. The Reeder compensator can also be used in a double pass amplifier (outcoupling set to 100%). Thermal birefringence is corrected over the entire operating range.

The Reeder Compensator according to the present invention is useful on any high average power laser where thermal birefringence is a problem. The inclusion of a Reeder compensator would also be advantageous in many commercial applications where high power lasers are used, e.g., laser machining and the like. Many of these lasers are lamp pumped -Nd:YAG, which exhibit high birefringence at the power levels being employed. This novel thermal birefringence compensator would greatly improve the beam quality from such a postulate high power laser.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A double pass laser system comprising:

a gain medium and a compensator optically coupled to said gain medium, said compensator comprising:

a Benson prism;

a first quarter waveplate with its principle axes aligned to the fold axis of said Benson prism; and a second quarter waveplate with its principle axis at 45° to the fold axis of said Benson prism.

2. The double pass laser system as recited in claim 1 wherein said laser system is a polarization outcoupled resonator further comprising a partially reflecting polarizing beam splitter optically aligned with said gain medium.

3. The double pass laser system as recited in claim 1 wherein said laser system is an outcoupled resonator further comprising a partially reflective outcoupler optically aligned with said gain medium.

4. The double pass laser system as recited in claim 1 wherein said laser system is a laser amplifier further comprising a totally reflecting polarizing beam splitter optically aligned with said gain medium.

* * * * *